US007393312B2

(12) United States Patent
Rousseau

(10) Patent No.: US 7,393,312 B2
(45) Date of Patent: Jul. 1, 2008

(54) OILING ROLLER ASSEMBLY FOR A DRUM MAINTENANCE UNIT

(75) Inventor: Gerard H. Rousseau, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 538 days.

(21) Appl. No.: 10/707,572

(22) Filed: Dec. 22, 2003

(65) Prior Publication Data

US 2005/0134632 A1 Jun. 23, 2005

(51) Int. Cl.
*B05C 1/10* (2006.01)
*F16C 13/00* (2006.01)

(52) U.S. Cl. ........................................ 492/17; 492/49

(58) Field of Classification Search .................. 492/47, 492/17
See application file for complete search history.

(56) References Cited

U.S. PATENT DOCUMENTS

| | | | | | |
|---|---|---|---|---|---|
| 2,563,049 | A | * | 8/1951 | Liebelt et al. | 401/197 |
| 2,565,743 | A | * | 8/1951 | Schaefer | 401/197 |
| 2,823,402 | A | * | 2/1958 | Phillips | 401/10 |
| 5,125,713 | A | * | 6/1992 | Willingham et al. | 296/98 |
| 5,406,885 | A | * | 4/1995 | Privin | 101/348 |
| 5,534,986 | A | * | 7/1996 | Irro et al. | 399/325 |
| 5,690,738 | A | * | 11/1997 | Boelkins | 118/249 |
| 5,805,191 | A | | 9/1998 | Jones et al. | 347/103 |
| 5,808,645 | A | | 9/1998 | Reeves et al. | 347/103 |
| 5,902,653 | A | * | 5/1999 | Miyahara et al. | 428/34.1 |
| 5,993,082 | A | * | 11/1999 | Verhoest et al. | 396/612 |
| 6,068,372 | A | | 5/2000 | Rousseau et al. | |
| 6,176,575 | B1 | | 1/2001 | Crawford et al. | 347/103 |
| 6,317,577 | B1 | * | 11/2001 | Baruch et al. | 399/325 |
| 6,431,703 | B2 | | 8/2002 | Rousseau et al. | |
| 6,480,694 | B1 | * | 11/2002 | Kimura et al. | 399/325 |
| 6,709,373 | B2 | * | 3/2004 | Park | 492/56 |
| 6,728,506 | B2 | * | 4/2004 | Morganti et al. | 399/325 |

* cited by examiner

*Primary Examiner*—David P. Bryant
*Assistant Examiner*—Sarang Afzali
(74) *Attorney, Agent, or Firm*—Oliff & Berridge, PLC

(57) ABSTRACT

A mounting scheme for a drum maintenance unit oiling roller assembly utilizing an end cap keeps the roller center justified on the image and/or keeps the oiling part of the roller centered on the image through a wide range of roller variation.

12 Claims, 5 Drawing Sheets

OILING ROLLER ASSEMBLY FOR A DRUM MAINTENANCE UNIT

BACKGROUND OF THE INVENTION

1. Field of Invention

This invention relates to an oiling roller for a drum maintenance unit.

2. Description of Related Art

It is known to utilize intermediate transfer layers in ink printing systems, such as disclosed in U.S. Pat. Nos. 6,068,372 and 6,431,703 to Rousseau et al. These systems utilize an oiling roller that engages the imaging drum and applies a liquid intermediate transfer layer to the imaging drum. The print head ejects drops of ink onto the liquid intermediate transfer layer to form an ink image thereon. A receiving substrate such as paper is then brought into contact with the intermediate transfer layer on the imaging drum and the ink image is transferred to the receiving substrate.

U.S. Pat. No. 6,480,694 or Kimura et at. describes an oiling roller made of a hollow cylindrical porous formed body that retains the release agent lubricant in the microdiameter voids and pores inside. The lubricant moves throughout the roller body by capillary force. The amount of lubricant applied to the imaging drum can be controlled by the amount of permeability resistance in the porous material. The retaining pores also prevent leakage of the lubricant.

A part of the solid ink technology printing process includes the drum maintenance unit. One of the drum maintenance unit's objectives is to apply a metered amount of release agent onto to the imaging drum prior to the print head imaging process. A metering blade meters the release agent applied by the oiling roller into a very thin film on the imaging drum that will be sufficient to have the ink preferably stick to the media rather than to the drum. Proper imaging requires release agent layer uniformity. When the agent is not applied uniformly the images exhibit noticeable streaks. The release agent can also change the gloss of images on a substrate and the projection efficiency of transparencies.

SUMMARY OF THE INVENTION

The parts of a drum maintenance unit are subject to wear and dirt accumulation. The oiling roller is often made of a compressible, porous, open-cell material, and is subjected to temperature, load and chemical conditions that affect the surface and length of the roller. A worn oiling roller can slide in the drum maintenance unit leaving the edge portions of the image drum without a sufficient release agent layer. An oiling roller with accumulated dirt or debris can leave a nonuniform release agent layer. One solution to the problem of drum maintenance unit wear would be to replace the component parts at periodic intervals. Such periodic maintenance can be costly and result in unnecessary down time of the imaging apparatus.

It is important that ink printing systems deliver a layer of release agent onto the imaging drum so that the ink can be easily peeled off during the print process. The oiling roller should be center justified on the image so that the whole width of the image is entirely covered by the roller. Ink printing systems also require an oiling roller that fits within tight dimensional tolerances. Oiling rollers that are undersized or that slide towards one side leave a portion of the image less than adequately oiled and consequently cause a release failure of the image off the drum. Optimum performance keeps the oiling part of the roller centered on the image through a wide range of roller length variation.

This invention is directed to a mounting scheme for a drum maintenance oiling roller that avoids various disadvantages and drawbacks associated with conventional systems. In various exemplary embodiments, a mounting scheme that utilizes end caps to mount the roller and keep the oiling part of the roller centered on an image is contemplated.

This invention provides a durable and reliable design that accommodates a wider range of roller length variation.

This invention separately provides systems and methods for quickly and easily installing an oiling roller into a drum maintenance unit cartridge.

This invention separately provides systems and methods for keeping an oiling roller centered on an image.

This invention separately provides systems and methods for keeping an oiling roller centered during the life of a drum maintenance unit, even when the roller's length is reduced due to temperature, load and/or chemical compatibility.

This invention separately provides systems and methods for keeping an oiling roller centered in a drawer of a drum maintenance unit.

This invention separately provides systems and methods for allowing an oiling roller to fit snug in a drawer of a drum maintenance unit without impeding the free rotation of the roller.

This invention separately provides systems and methods for positioning an oiling roller in a predictable position over the life of a drum maintenance unit.

This invention separately provides systems and methods for keeping an oiling roller securely positioned in a drum maintenance unit.

This invention separately contributes to a reduction in costs of manufacture and maintenance of a drum maintenance unit.

Various exemplary embodiments of this invention provide an oiling roller assembly, comprising an oiling roller, a roller shaft about which the oiling roller rotates and at least one cap unit disposed on an end of the roller shaft. The at least one cap unit may further comprise a flange portion at an end of the cap and a recess portion at an opposite end of the cap. The at least one cap unit may comprise a pair of caps. Each of the pair of caps may be substantially identical.

In various exemplary embodiments of this invention, the oiling roller assembly further comprises a retainer disposed onto at least one end of the roller shaft and positioned between at least one end of the oiling roller and the at least cap unit.

In various exemplary embodiments of this invention, the at least one cap unit compresses the oiling roller material.

In various exemplary embodiments of this invention, the at least one cap unit disposed on an end of the axel of the oiling roller snaps into a drawer of a removable cassette. The at least one cap unit may be locked in place through a latching feature in the drawer. The retainer disposed onto at least one end of the roller shaft may provide an additional latching mechanism.

Various exemplary embodiments of this invention provide a drum maintenance unit for an imaging apparatus comprising the oiling roller assembly. The drum maintenance unit may be disposed in a removable cassette. The drum maintenance unit or the cassette may be a consumable unit.

Various exemplary embodiments of this invention provide a method for mounting an oiling roller in a drum maintenance unit.

BRIEF DESCRIPTION OF THE DRAWINGS

Various exemplary embodiments of the systems and methods of this invention are described in detail below, with reference to the attached drawing figures, in which.

DETAILED DESCRIPTION OF EXEMPLARY EMBODIMENTS

This invention may be applied to various oiling roller assembly configurations and is not limited to the particular configurations disclosed by the exemplary embodiments. Those skilled in the art will appreciate an oiling roller assembly system in accordance with this invention without including all of the particular features disclosed by the exemplary embodiments.

Figure 1:
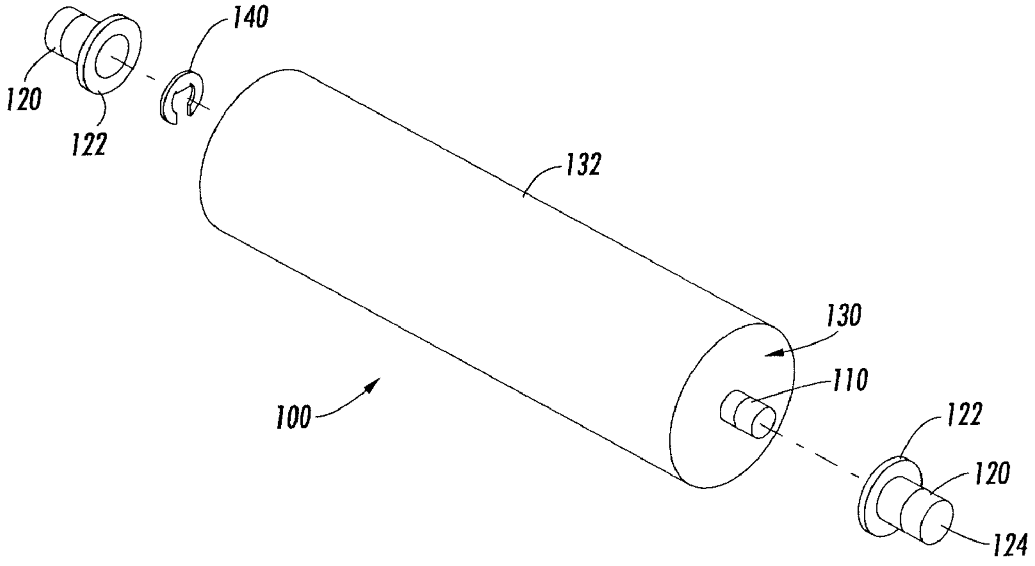
FIG. 1 is a view of a first exemplary embodiment of an oiling roller according to this invention.

FIG. 1 illustrates a first exemplary embodiment of an oiling roller assembly 100 according to this invention. The assembly 100 comprises an oiling roller 130 mounted on a roller shaft 110. A pair of end caps 120 are disposed on opposite ends of the shaft 110. Each cap 120 comprises a flange portion 122 at one end of the cap that comes into contact with the roller 100. Each cap 120 further comprises an indented or hollow recess portion 124 at the end opposite to the flange portion 122. The oiling roller assembly 100 can also comprise an optional e-ring unit 140 snapped onto one end of the roller shaft 110 and positioned between one end of the oiling roller 130 the cap unit 120. An outer surface 132 of the oiling roller 130 contacts with an imaging drum of a printing device when installed therein (not shown).

In the exemplary embodiment shown, the oiling roller 130 is a porous formed body of a hollow cylindrical shape, capable of retaining releasing agent. The oiling roller 130 is made of a compressible material. In embodiments, the material has a hardness of about 10-15 Shore A. In embodiments, the oiling roller 130 is made of a heat-resistant material having micro-diameter voids. The material comprising the oiling roller 130 offers an air permeability resistance of about 1.07 SCFM@ 3 psi. The heat-resistant material comprising the oiling roller 130 is chemically and mechanically stable, for example, under heating at a temperature of about 60-70° C. Possible materials for the oiling roller 130 include polyurethane foam.

Figure 2:
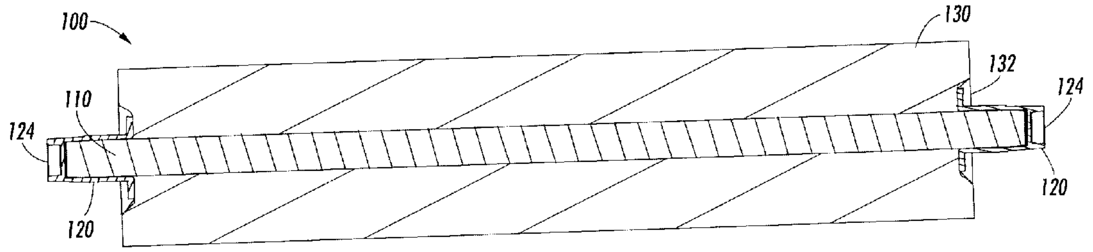
FIG. 2 is a cross-sectional view in an axial direction of the first exemplary embodiment of an oiling roller according to this invention.

FIG. 2 illustrates is a cross-sectional view in an axial direction of the first exemplary embodiment of this invention. The end caps 120 are mounted to each end of the shaft 110. The end caps 120 can be pushed inward into the roller 130 so that the flange portion 132 of the cap compresses the compressible porous material of the roller 130, causing the material to deflect. The compressibility of the roller's porous material provides a lateral load to the end cap 120 that can be utilized to latch the roller assembly 100 in a drum maintenance unit.

Figure 3:
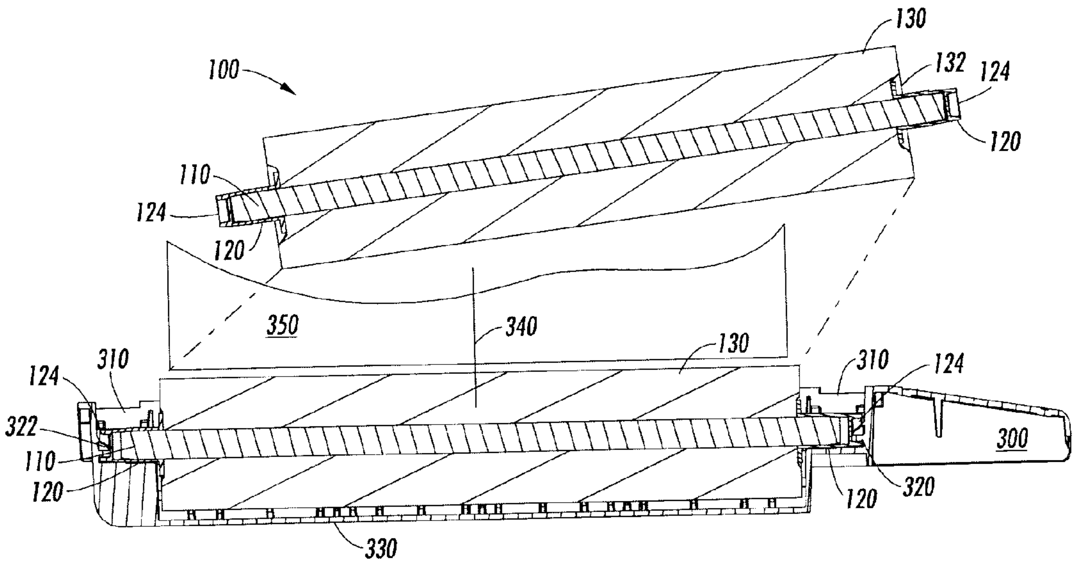
FIG. 3 is a cross-sectional view in an axial direction of a cassette of a drum maintenance unit into which an embodiment of the oiling roller according to this invention is installed.

FIG. 3 further illustrates how the first exemplary embodiment of this invention can be installed into a drawer 310 of a drum maintenance unit 300. The drum maintenance unit 300 comprises a drawer 310, which itself comprises latching features 320 and 322 and a release agent pan 330. Prior to inserting the oiling roller assembly 100 into the drawer 310, the two end caps 120 are pushed inward, compressing the roller material so that the assembly can clear the latching features 320 and 322 in the drawer 310. The roller assembly 100 is then placed in the drawer 310. Once the caps 120 are snapped into place in the drawer 310, the compressible roller material springs back, causing the roller assembly 100 to fit snug in the drawer 310. The end caps 120 are snapped into place in the drawer 310 so that the recess portions 124 of the caps receive the latching features 320 and 322.

The oiling roller assembly 100 is wide enough to cover the entire image space 350. In embodiments, the oiling roller assembly 100 is positioned in the drawer 310 so that the center of the roller 130 corresponds to about the center of the image 340 on the image drum. The oiling roller assembly 100 fits snug in the drawer 310, but without impeding the free rotation of the roller 130. The compressed porous material of the oiling roller assembly 100, and the end caps 120, provide two lateral, opposed loads that will keep the oiling roller 120 centered in the drawer 310 and on the image 340. The oiling roller assembly 100 is also positioned to fit in the drum maintenance unit 300 to allow enough clearance between the oiling roller 130 and the release agent pan portion 330 of the drawer 310.

Figure 4:
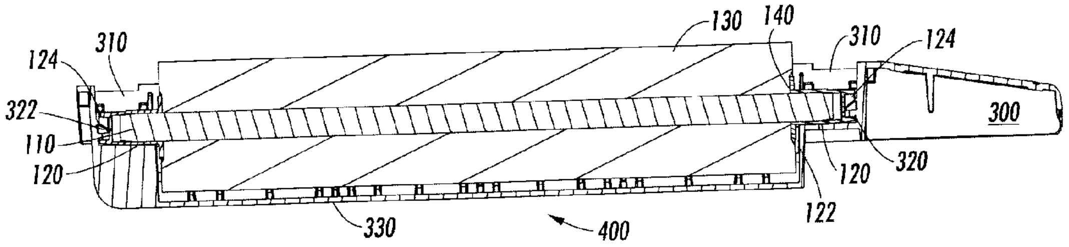
FIG. 4 is a cross-sectional view in an axial direction of a second exemplary embodiment of an oiling roller according to this invention.

FIG. 4 illustrates a second exemplary embodiment of an oiling roller assembly 400 according to this invention. This embodiment includes a retainer such as an e-ring 140 at one end of the shaft 110 that is positioned between the end cap 120 and the oiling roller 130. The e-ring 140 provides an extra level of security to guard against the oiling roller assembly 100 popping out of the drum maintenance unit 300 in case of shock or drop. The e-ring 140 is positioned on the shaft 110 such that it allows the end cap 120 to push inward and compress the roller 130, but limits the degree of deflection. As a result, the oiling roller assembly 100 maintains a stronger interlocking scheme in the drawer 310 of the cassette 300.

Figure 5:
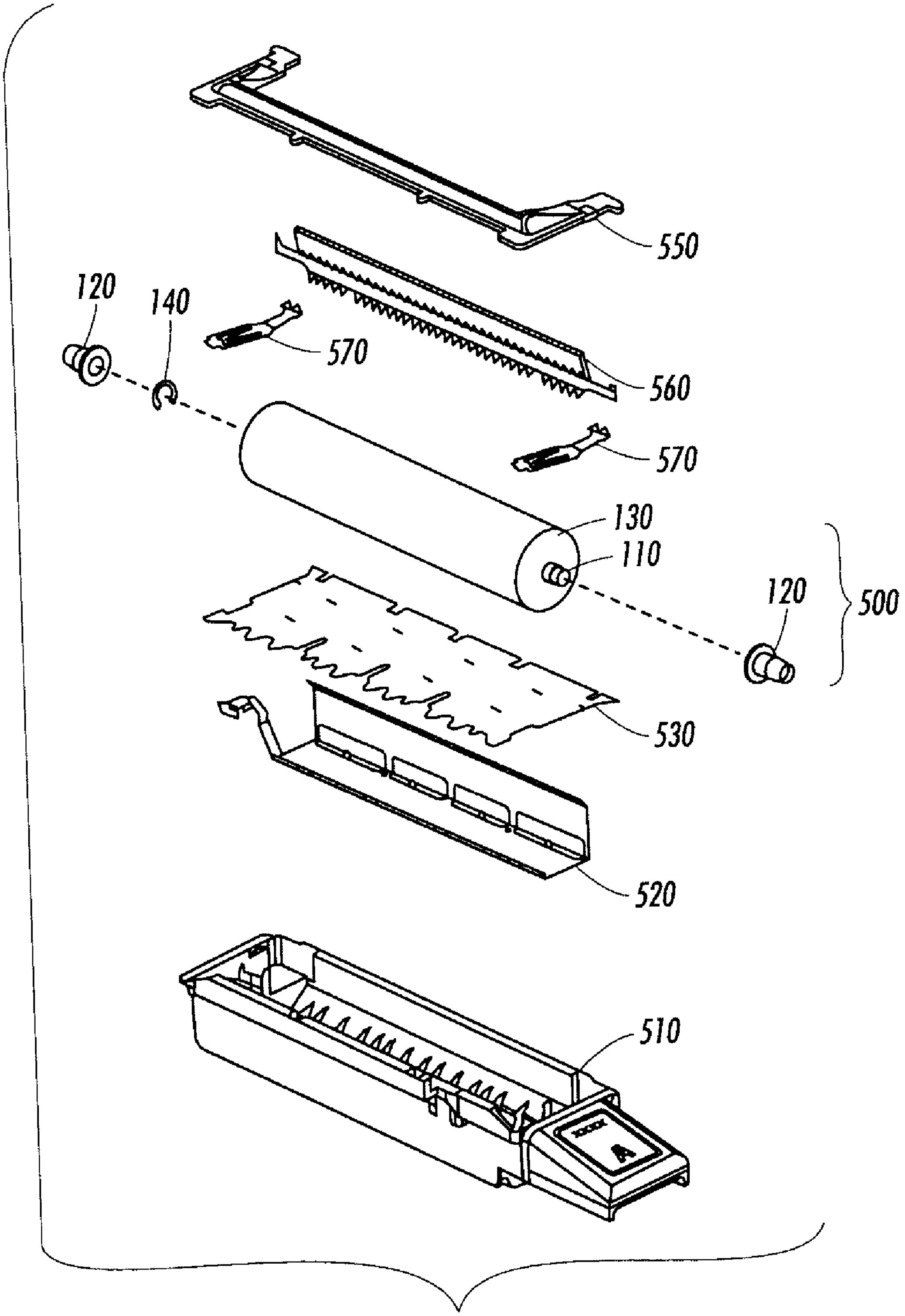
FIG. 5 is an exploded perspective view of a replaceable cassette for an imaging apparatus according to an exemplary embodiment of this invention.

FIG. 5 illustrates an exploded perspective view of a replaceable cassette 510 for an imaging apparatus according to an exemplary embodiment of this invention. Disposed within the replaceable cassette 510 is a static shield 520, a filter 530, an oiling roller assembly 500, a metering blade assembly 560 with leaf springs 570 and a top cover 550. Details of the replaceable cassette are discussed in copending U.S. patent applications Ser. Nos. 10/740,461, 10/707,572, 10/707,577,10/707,574.

While this invention has been described in conjunction with the exemplary embodiments outlined above, it is evident that many alternatives, modifications and variations will be apparent from a review of the foregoing. Accordingly, the exemplary embodiments of the invention, as set forth above, are intended to be illustrative, not limiting. Various changes may be made without departing from the spirit and scope of the invention.

The invention claimed is:

1. An oiling roller assembly, comprising:

an oiling roller;

a roller shaft about which the oiling roller rotates; and at least one cap unit disposed on an end face of the roller shaft, and wherein the at least one cap unit comprises a flange portion at an end of the at least one cap unit that comes into contact with the oiling roller, and a recess portion at an opposite end of the at least one cap unit, wherein the oiling roller has a porous formed body made of compressible material, and wherein the roller shaft extends an entire length of the oiling roller and the oiling roller is mounted on the roller shaft, wherein the compressible material extends from the roller shaft to an outside surface of the oiling roller, and wherein the oiling roller is in direct contact with the roller shaft through the entire length of the oiling roller.

2. A drum maintenance unit, comprising the oiling roller assembly of claim 1.

3. The drum maintenance unit of claim 2, further comprising a drawer, wherein the oiling roller assembly is installed in the drawer.

4. The drum maintenance unit of claim 2, wherein the oiling roller assembly is held in place by latching features.

5. The oiling roller assembly of claim 1, wherein the at least one cap unit comprises a pair of caps.

6. The oiling roller assembly of claim 5, wherein each of the pair of caps is substantially identical.

7. The oiling roller assembly of claim 1, further comprising a retainer disposed onto at least one end of the roller shaft.

8. The oiling roller assembly of claim 1, wherein the at least one cap unit disposed on an end face of the oiling roller can be squeezed with an inward force to deflect the roller, while the roller provides an opposite force lateral load to the end of the at least one cap unit.

9. An oiling roller assembly, comprising:

an oiling roller;

a roller shaft about which the oiling roller rotates; and at least one cap unit disposed on an end face of the roller shaft, and wherein the at least one cap unit comprises a flange portion at an end of the at least one cap unit that comes into contact with the oiling roller, and a recess portion at an opposite end of the at least one cap unit, wherein the oiling roller has a porous formed body made of compressible material, and wherein the at least one cap unit compresses the compressible material of the oiling roller where it contacts the oiling rollers, wherein the compressible material extends from the roller shaft to an outside surface of the oiling roller, and wherein the oiling roller is in direct contact with the roller shaft through the entire length of the oiling roller.

10. The oiling roller assembly of claim 9, wherein the at least one cap unit comprises a pair of caps.

11. The oiling roller assembly of claim 10, wherein each of the pair of caps is substantially identical.

12. The oiling roller assembly of claim 9, further comprising a retainer disposed onto at least one end of the roller shaft.

* * * * *